United States Patent
Smith et al.

(10) Patent No.: US 8,216,505 B2
(45) Date of Patent: Jul. 10, 2012

(54) METHOD FOR MANUFACTURING SOLID INK STICKS WITH AN INJECTION MOLDING PROCESS

(75) Inventors: Terry Alan Smith, Aurora, OR (US); Edward Francis Burress, West Linn, OR (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/207,530

(22) Filed: Aug. 11, 2011

(65) Prior Publication Data

US 2011/0298155 A1    Dec. 8, 2011

Related U.S. Application Data

(62) Division of application No. 12/235,174, filed on Sep. 22, 2008, now Pat. No. 8,038,424.

(51) Int. Cl.
*B29C 45/72* (2006.01)
(52) U.S. Cl. .............................. 264/328.16; 264/328.18
(58) Field of Classification Search ............... 264/328.1, 264/328.16–328.18
See application file for complete search history.

(56) References Cited

U.S. PATENT DOCUMENTS

| | | |
|---|---|---|
| 2,309,943 A | 2/1943 | Ernst |
| 3,697,204 A | 10/1972 | Kyritsis et al. |
| 4,197,070 A | 4/1980 | Koschmann |
| 4,426,402 A | 1/1984 | Kaupert |
| 4,501,498 A | 2/1985 | Mckelvey |
| 4,889,478 A | 12/1989 | Sato |
| 5,372,852 A | 12/1994 | Titterington et al. |
| 5,409,722 A | 4/1995 | Binley |
| 5,439,695 A | 8/1995 | Mackey |
| 5,820,910 A | 10/1998 | Jury |
| 5,902,621 A | 5/1999 | Beckett et al. |
| RE36,937 E | 10/2000 | Mackley |
| 6,149,846 A | 11/2000 | Zerafati-Jahromi et al. |
| 6,391,356 B1 | 5/2002 | Willcocks et al. |
| 6,419,970 B1 | 7/2002 | Willcocks et al. |
| 6,692,668 B2 * | 2/2004 | Ogrinc et al. ................... 264/28 |
| 7,186,762 B2 * | 3/2007 | Wong et al. ................... 523/160 |
| 7,303,387 B2 | 12/2007 | Hutchinson et al. |
| 7,802,880 B2 * | 9/2010 | Jones et al. ...................... 347/88 |
| 7,862,324 B2 * | 1/2011 | Jones et al. ............. 425/436 RM |
| 2004/0166188 A1 | 8/2004 | Uchiyama et al. |
| 2004/0170750 A1 | 9/2004 | Bunick et al. |
| 2004/0201657 A1 * | 10/2004 | Jones et al. ...................... 347/99 |
| 2005/0113482 A1 * | 5/2005 | Wong et al. ................... 523/160 |
| 2007/0030322 A1 * | 2/2007 | Lee et al. ......................... 347/88 |

(Continued)

OTHER PUBLICATIONS

Thrower, Larry; Non-Final Office Action for U.S. Appl. No. 12/236,431, Mailed May 11, 2010, United States Patent and Trademark Office (8 pages).

(Continued)

*Primary Examiner* — Jill Heitbrink
(74) *Attorney, Agent, or Firm* — Maginot, Moore & Beck, LLP

(57) ABSTRACT

A method manufactures solid ink sticks by forming a solid ink paste and injecting the paste into a mold having internal cavities. The solid ink paste can be formed by mixing liquid ink and solid ink in a barrel of an injection molding machine. The liquid ink is formed by melting solid ink particulates in the barrel with a heated conveyor and the solid ink particulates are maintained in a solid phase by cooling a portion of the barrel. Movement produced by the heated conveyor mixes the liquid ink and the solid ink in an area between the cooled portion of the barrel and the heated conveyor.

10 Claims, 3 Drawing Sheets

U.S. PATENT DOCUMENTS

2008/0225096 A1\* 9/2008 Jones et al. ............... 347/99
2011/0032318 A1\* 2/2011 Rodney-Jones et al. ........ 347/99

OTHER PUBLICATIONS

Lockman, David; Amendment in response to Non-Final Office Action for U.S. Appl. No. 12/236,431, submitted Jul. 12, 2010 (8 pages).

Thrower, Larry; Final Office Action for U.S. Appl. No. 12/236,431, United States Patent & Trademark Office, mailed Aug. 30, 2010 (9 pages).

Lockman, David; Amendment accompanying Request for Continuation for U.S. Appl. No. 12/236,431, submitted Oct. 19, 2010 (8 pages).

Thrower, Larry; Second Non-Final Office Action for U.S. Appl. No. 12/236,431, Mailed Aug. 18, 2011, United States Patent and Trademark Office (11 pages).

Lockman, David; Amendment in response to Second Non-Final Office Action for U.S. Appl. No. 12/236,431, submitted Oct. 32, 2011 (8 pages).

\* cited by examiner

METHOD FOR MANUFACTURING SOLID INK STICKS WITH AN INJECTION MOLDING PROCESS

CLAIM OF PRIORITY

This application is a divisional application that claims priority from commonly assigned, U.S. patent application Ser. No. 12/235,174, which was filed on Sep. 22, 2008, is entitled "System And Method For Manufacturing Solid Ink Sticks With An Injection Molding Process," and which will issue as U.S. Pat. No. 8,038,424 on Oct. 18, 2011.

TECHNICAL FIELD

This disclosure relates generally to the manufacture of solid ink sticks and, more particularly, to the manufacture of solid ink sticks with non-pouring techniques.

BACKGROUND

Solid ink or phase change ink printers conventionally receive ink in a solid form and convert the ink to a liquid form for jetting onto a receiving medium. The solid ink, either in pellet or ink stick form, is typically loaded into a feed channel of a printer. The solid ink is then delivered by gravity or mechanical force, or some combination of these forces, through the feed channel to a heater plate. The heater plate melts the solid ink into a liquid form and the liquid is conveyed to a printhead, which ejects the ink onto a receiving medium in accordance with a driving signal generated by a printhead controller.

The solid ink used in a solid ink printer can be any appropriate phase change ink that employs a suitable colorant, such as dye or a colored resin, and an ink carrier composition which is compatible with the colorant. The phase change ink of an appropriate composition can employ a carrier composition that utilizes a fatty-amide containing material, which may be any appropriate amide compound, such as typically a tetra-amide, and/or a tri-amide compound and/or a mono-amide compound or other suitable amides, and combinations thereof. Alternatively, the phase change ink can employ a urethane resin, a mixed urea/urethane resin and a monoamide, or any other carrier composition appropriate for jetting.

An appropriate colorant can be employed in the ink composition to achieve cyan, magenta, yellow and black colors suitable for ink jet CMYK subtractive color printing applications. These colored inks can be formed by using a single dye or a mixture of dyes. For example, magenta can be obtained by using a mixture of solvent red dyes or a composite black can be obtained by mixing several dyes. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

Ink sticks are used in a number of solid ink printers because they enable the ink to be formed with a particular configuration rather than the more generic and non-differentiated structure of pellets. Currently, solid ink sticks are typically manufactured with a formed tub and flow fill process. In this method, the component dyes and carrier composition are first compounded and then heated to a liquid state and poured into a tub having an interior shape corresponding to the desired finished ink stick shape. The result is an ink stick that, at room temperature, is typically a solid having a wax-like consistency. Colorant added to the ink composition can be a dye or pigment or combination. For simplification the term dye is used herein to describe the colorant added to an ink composition to provide color.

Solid ink sticks formed by the flow fill method may have aesthetic flaws because the top surface is not shaped by a surface and the melted ink may cool unevenly in the tub. In addition to aesthetic issues, the sticks may have wide range of dimensional variation that may adversely affect movement and orientation in the feed channels. Consequently, the feed channels are required to be made with structures that are tolerant of these relatively wide dimension ranges. The feed channels are also typically configured with sensors for monitoring the amount of solid ink in a channel in order to generate signals for notifying operators that additional solid ink should be loaded into a channel. The wider dimensional ranges of ink sticks accommodated by feed channels may make sensor placement or location more difficult or affect sensing functions. Additionally, significant differences in molten versus solid densities may cause ink sticks formed by the flow fill method to have internal stresses that result in breakage during handling and shipping. Cracks and internal air pockets may also develop during cooling of the ink in the tub and enable the sticks to absorb moisture from the environment. These issues are exacerbated when flow fill methods are used to make larger mass sticks.

Compression molding is an alternative method for forming solid ink sticks. In this method, solid particulate is poured into a mold and then a surface that fits the opening through which the solid ink particulate was poured is pressed against the particulate with sufficient force that the particulate melts and conforms to the pressure chamber formed by the surface and the mold. This method addresses many of the issues that may occur with fill-flow methods, but the compression molding method may fail to seal the outer surface or skin of the sticks uniformly. Thus, sticks made by this method may also allow moisture to be absorbed from the air.

Industry standard liquid injection molding methods have been accomplished with limited success. A small ink stick or one with a narrow cross section may be produced with such a method without incurring significant problems, such as deformation, cracks, internal stresses, air pockets, or damage to the sticks, provided that the dwell time for the liquid material in the mold cavity is sufficiently long that the liquid ink is permitted to solidify substantially. As sticks become more complex in shape and larger for a multitude of performance and user requirements, the standard molding processes fail to produce ink sticks that do not suffer from one or more of the above-identified problems. Additionally, the larger and more complex ink sticks tend to stick in the molds. Thus, while molding is desirable to obtain dimensional accuracy, shape complexity, and improved aesthetics, no current molding process appears capable of reaching these goals.

SUMMARY

A method has been developed that enables solid ink sticks to be formed without problematic internal stresses, with more precise dimensions, and with a more aesthetic skin that is more impervious to moisture. The method forms a solid ink paste and injects the paste into a mold having internal cavities that are cooled to encourage formation of a skin for the ink sticks that better seals the ink in the stick, enables ink stick separation from the mold cavities, and more immediate handling. The method includes generating a solid ink paste, cooling a mold having at least two separable shells that form ink stick cavities, injecting a portion of the paste under pressure into the mold, and separating the shells of the mold to release solid ink sticks from the ink stick cavities. The paste may be formed by a variety of techniques, including heating a first quantity of solid ink particulates to a temperature at which the solid ink particulates reach a liquid state and then mixing the first quantity of solid ink particulates with a second quantity of solid ink particulates in or near a solid state to form a paste. This paste is suitable for injection into a cooled mold having internal cavities to form solid ink sticks.

This method of ink stick manufacture may be used with an injection molding machine to form a system for manufacturing solid ink sticks. The system includes an injection molding machine having a barrel in which a heated member is located, the barrel having an outlet. The system also includes a cooling jacket mounted on an exterior of the barrel, a movable member located within the barrel, a heater located within the movable member, an actuator coupled to the movable member, and a controller coupled to the heater, the cooling jacket, and the actuator, the controller being configured to regulate the heater to maintain the movable member within a temperature range in which liquid ink remains in a liquid or near liquid state, to operate the cooling jacket to maintain the barrel in a temperature range in which ink remains in a solid or near solid state, and to energize the actuator to cause the movable member to mix the liquid or near liquid ink proximate the movable member with the solid or near solid ink proximate the barrel to form a solid ink paste.

BRIEF DESCRIPTION OF THE DRAWINGS

The foregoing aspects and other features of a solid ink stick manufacturing system and method are explained in the following description, taken in connection with the accompanying drawings.

DETAILED DESCRIPTION

Figure 1:
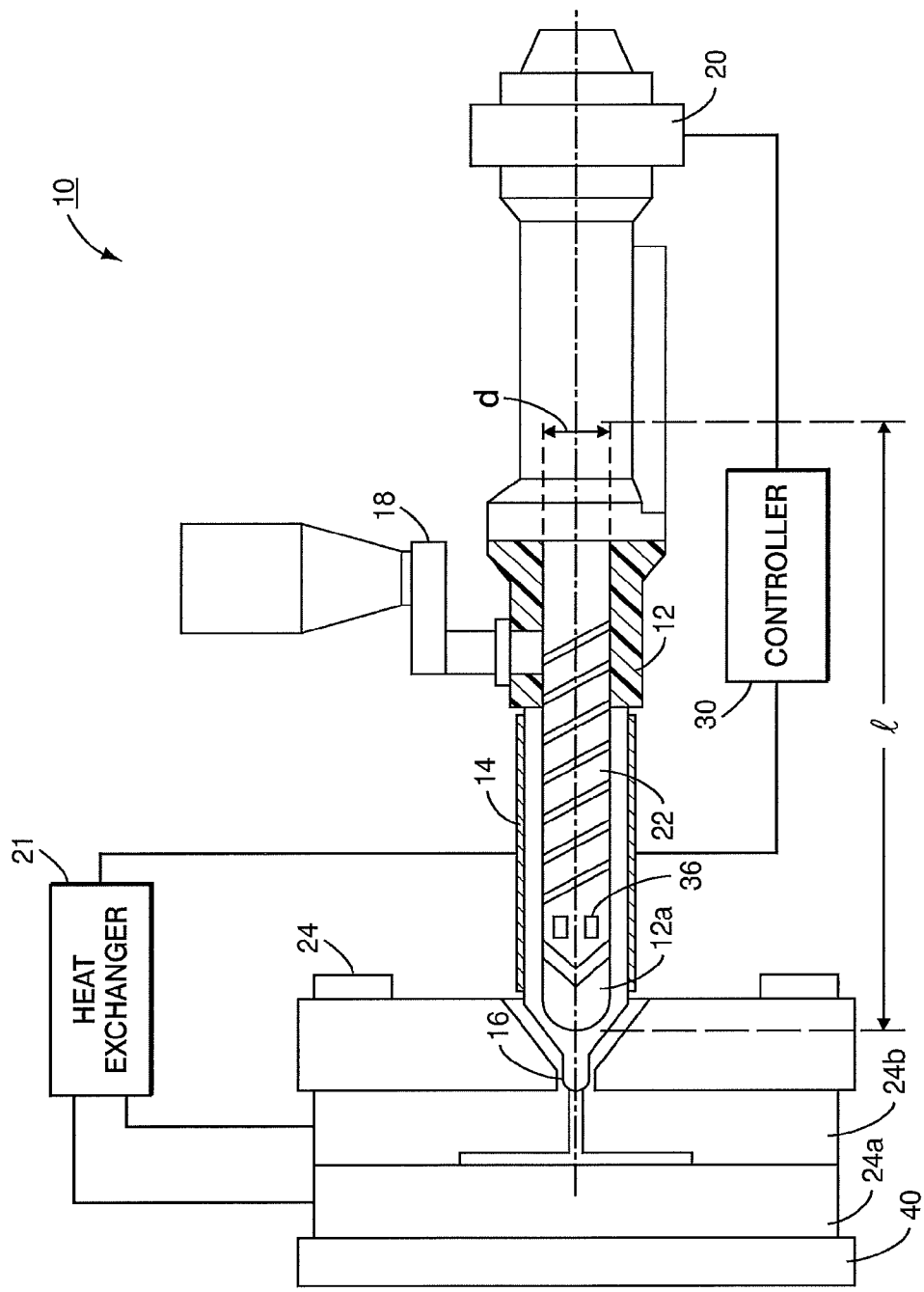
FIG. 1 is a diagram of an injection molding machine in which solid ink sticks may be manufactured.

For a general understanding of the environment for the system and method disclosed herein as well as the details for the system and method, reference is made to the drawings. In the drawings, like reference numerals have been used throughout to designate like elements. As used herein, the word "printer" encompasses any apparatus that performs a print outputting function for any purpose, such as a digital copier, bookmaking machine, facsimile machine, a multi-function machine, etc.

FIG. 1 depicts an injection molding machine 10 in which the method of manufacturing solid ink sticks, which is described below, may be implemented. The custom made injection molding machine 10 has a barrel 12 with a diameter of 80 mm and a length l of approximately 2.5 m. Solid ink particulates may be supplied to the injection-molding apparatus 10 through a feeder 18. As discussed in more detail below, the paste may be generated elsewhere and then fed to the injection molding machine. If solid ink particulate is provided through the feeder 18, the solid ink particulate may be produced by any known technique. The size of the particulates can range from more than 10 mm to about 0.5 microns.

The small size of the particulates provides greater surface area for heating to enable the particulate to respond to heating and cooling quickly. While smaller particulates are desirable for this reason, manufacture, storage, and transport of the particulate may influence the optimal size for the particulate material used in a particular environment.

A temperature profile of the barrel 12 is maintained by one or more cooling jackets 14, which are grouped into independently controlled zones along the barrel 12, including along a barrel head 12a and a nozzle portion 16. The cooling jackets include fluid passageways that enable a coolant to flow through the jacket. The coolant absorbs heat from the barrel and the warmed fluid is passed through a heat exchanger 44 to remove the heat from the fluid. The fluid may then be re-circulated through the jacket to continue the cooling of the barrel. The fluid may be, for example, an oil or an ethylene glycol. A rotary actuator or drive 20 turns a retractable screw 22 within the barrel 12. The screw 22 is also hollow to enable heaters (not shown) to be placed within the screw. Selective activation of the heaters controls the temperature of the screw. In the custom injection molding machine, the screw 22 has a diameter of 25 mm.

The heaters or other thermal controlling elements within the screw 22 and the cooling jackets 14 are coupled to a controller 30. The controller is a processor and related input/output circuitry with volatile and non-volatile memory. Programmed instructions are stored in a portion of the memory for execution by the processor to control the injection molding process. These instructions may be programmed in a known manner to configure the controller to monitor the temperature of the barrel, the screw, and other areas of the machine and to regulate these temperatures by controlling the heaters within the screw and the flow of coolant through the cooling jackets. Additionally, the controller is coupled to the drive 20 to move the screw within the barrel 12 in a programmed manner. Thus, the ability of the machine 10 to form solid ink sticks depends upon the configuration of the controller by the programming instructions stored in the memory of the controller. In one application, the nominal target temperature is in a range of about 95 degrees C. to about 135 degrees C., and more specifically about 120 degrees C. to about 132 degrees C., for the screw and the nominal target temperature is in a range of about 45 degrees C. to about 65 degrees C., and more specifically about 50 degrees C. to about 60 degrees C., for the barrel.

If all of the solid ink particulate within the barrel reaches the melting temperature for the solid ink particulate, the ink fails to respond to the rotation of the screw to move forward to the nozzle 16 of the barrel 12. On the other hand, if all of the solid ink particulate remains in a solid state, the particulate fails to achieve sufficient flow characteristics to enable injection of the material from the barrel into a mold coupled to the nozzle 16. To enable the solid ink particulate to acquire a consistency that enables movement within the barrel and injection into the mold, the controller has been configured through programming instructions to heat the screw to a temperature that maintains the solid ink particulate proximate the heated member in a liquid state and to regulate the barrel temperature at a level that keeps the solid ink particulate proximate the barrel in a solid state. The liquid ink proximate the screw enables the screw to rotate freely. The screw rotation acts to mix the melted ink with the solid ink particulate between the screw and the barrel to form a paste. The paste also responds to the rotation of the screw by being moved forward towards the nozzle. A non-return valve 36 prevents the paste from squeezing backwards into the barrel portion 12 during injection. Thus, the controller maintains the screw 22 at a temperature that generates a sufficient amount of melted ink to form a paste when mixed with the solid ink particulate in the barrel by the rotation of the screw.

As used herein, the term "paste" refers to a material in a state between liquid and solid, which may be described as semi-liquid or semi-solid. These two descriptions, semi-liquid and semi-solid, are synonymous. The liquid state for the material being processed is a state in which the material conforms to the shape of a sharp cornered container as the material is poured into the container. The solid state refers to the state in which a 25 mm cubic block of the material at an elevated, uniform temperature above 25 degrees C. is not penetrated more than 1 mm at the center of one block face by a blunt end of a shaft having a 6.35 mm diameter, which is pushed by a 20 Newton force for one minute. At typical room temperatures and at elevated temperatures when still fully solid, the ink is not penetrated by the shaft as described above. As the temperature of the ink is elevated further, such as in an oven, a temperature is reached at which the above-identified rate of penetration is achieved. Temperatures above that point result in more rapid or deeper penetration and, in an even warmer liquid state, the block does not resist penetration in any typical sense. Ink over some portion of the temperature range at which the described paste state exists may also be described as a slurry since a portion of the paste is liquid and another portion of the paste is solid or nearly solid. The reader should appreciate that the waxy nature of solid ink undergoes a state change from solid to liquid over a wide temperature range that is extended in comparison to other more familiar substances, such as water becoming ice when chilled or steam when heated. Different constituents in the ink melt at different temperatures so the material is not easily induced into a homogeneous paste state by simply altering its temperature. Therefore, ink appears to be solid when nearly so and liquid when not fully so. This understanding of material states related to temperature should aid the reader in seeing that churning or mixing ink that is liquid with ink that is solid results in a temperature change of that ink and yield a more uniform paste consistency over a fairly short period of time. The process of producing this paste state can occur by mixing fully liquid material with fully solid material in appropriate proportions based on churning or mixing effectiveness for an adequate time, allowing the cooler mass to warm and the warmer mass to cool. A paste state may also be attained by mixing ink that has not fully reached the liquid state with ink that is not fully solid, to generate any combination of fully or partially liquid ink mixed with fully or nearly solid ink, depending upon the amount of time the two states or near-states are mixed and the effectiveness of the mixing. The mixing or churning of the range of material states is affected by shear tendencies of the different states and these tendencies are affected by temperature of the different material states and the gap of confinement between heated and cooled members or structures of the injection molding machine or press. Holding ink at a temperature intermediate the solid and liquid states for an extended period of time allows the ink to become a usable paste, but this method of producing paste may not be practical in high volume production scenarios.

The press barrel 12 is maintained at a temperature that prevents all of the solid ink particulate in the barrel from being melted so a paste can be formed. Although the barrel may be described as cooled, this term is used in a relative sense. Thus, the "cooler" temperature of the barrel is defined as being below the ink melt temperature so this surface may in fact, at times, be heated and, at other times, be cooled to prevent it from becoming too hot. The rotation of the screw 22 also mechanically transports the paste to the nozzle 16 so the controller can energize the reciprocating actuator and pressurize a portion of the paste to eject a shot of paste from the nozzle 16 into the mold 24. Once the paste shot has been injected, the rotary drive 20 rotates the screw 22 to continue making the paste and to transport a portion of the paste forward to the nozzle. The rotary drive portion 20 is controlled by the controller to transport each shot through the barrel portion 12 in regular cycles at a set velocity to enable the time that each shot spends in the different temperature zones of the barrel 12 to be precisely controlled. This precision enables the consistency of each shot to be reproducibly controlled. A drive or actuator may rotate a screw for mixing and/or feeding ink or may accomplish those functions with a linear motion, such as reciprocating motion of a screw or a piston, plunger, or ram. Combinations of rotary and linear motion may be used with a screw or ram within a molding machine. An actuator may also move an ejection member that is independent of the barrel and an internal feed device or conveyor, which may be a ram, screw, or some conveyor combination.

The mold 24 is a mold having internal cavities that are coupled together by runners, as known in the art, although other types of molds may be used. As shown in FIG. 1, a clamp 40 moves the two sections 24a, 24b of the mold 24 towards and away from one another. The applied clamp force is dependent on the size and the number of the ink sticks to be molded, and may range from around 100 tons to around 15 tons for known ink stick sizes and typical cavity counts. In one embodiment, a clamp force of about 25 tons is applied to the mold. The mold also includes an inlet that is configured for mating with the nozzle 16 of the barrel 12. The inlet enables a paste shot ejected from the nozzle to enter the mold to form ink sticks within the internal cavities of the mold.

The ink paste enters the mold cavities through gates that are fed either by the nozzle of the barrel or, if multiple cavities are within a mold, runners extending from the nozzle. Because the ink paste is thicker than materials typically injected into molds and a goal of the process is to prevent ink temperatures from elevating excessively, larger than typical gates are desired. Small gates require higher injection forces that increase the velocity and friction of the material as it enters the cavity. These factors heat the material and may attenuate the benefit of injecting ink into a mold with a paste consistency. Gate size is influenced by the timing of the injection cycle and the volume and shape of the cavity or cavities to be filled. In one embodiment, the gate size has a diameter of approximately 5 mm.

The mold 24 also includes one or more fluid passageways that are not in fluid communication with the internal cavities. These passageways may be coupled to a cooling system that pumps a coolant through the passageways to remove heat from the mold. The coolant may be an oil or ethylene glycol and the coolant is circulated through a heat exchanger 44 to remove heat from the coolant and renew the ability of the coolant to maintain the temperature of the mold below the liquid state maintaining temperature. Thus, a paste shot entering the mold forms a skin as a portion of the shot contacts a wall of an internal cavity of the mold. The skin helps seal the ink stick so it is relatively impervious to moisture after the ink stick is released from the mold. Additionally, the skin is sufficiently thick that the mold may be separated by the controller operating the clamp relatively quickly after the injection of the paste shot into the mold without deformation of the ink stick. The skin and the amount of paste in a shot are adequate to enable the ink internal to the skin to cool without shrinkage or breakage of the skin. In one embodiment, the mold is maintained within a temperature range of about −5 degrees C. to about 5 degrees C. Depending upon material properties and mold dwell times, this temperature range may extend from about −60 degrees C. to over 20 degrees C. Because moisture in the air may produce ice particles at the lower temperatures, the process is better performed in a relatively dry environment.

Figure 2:
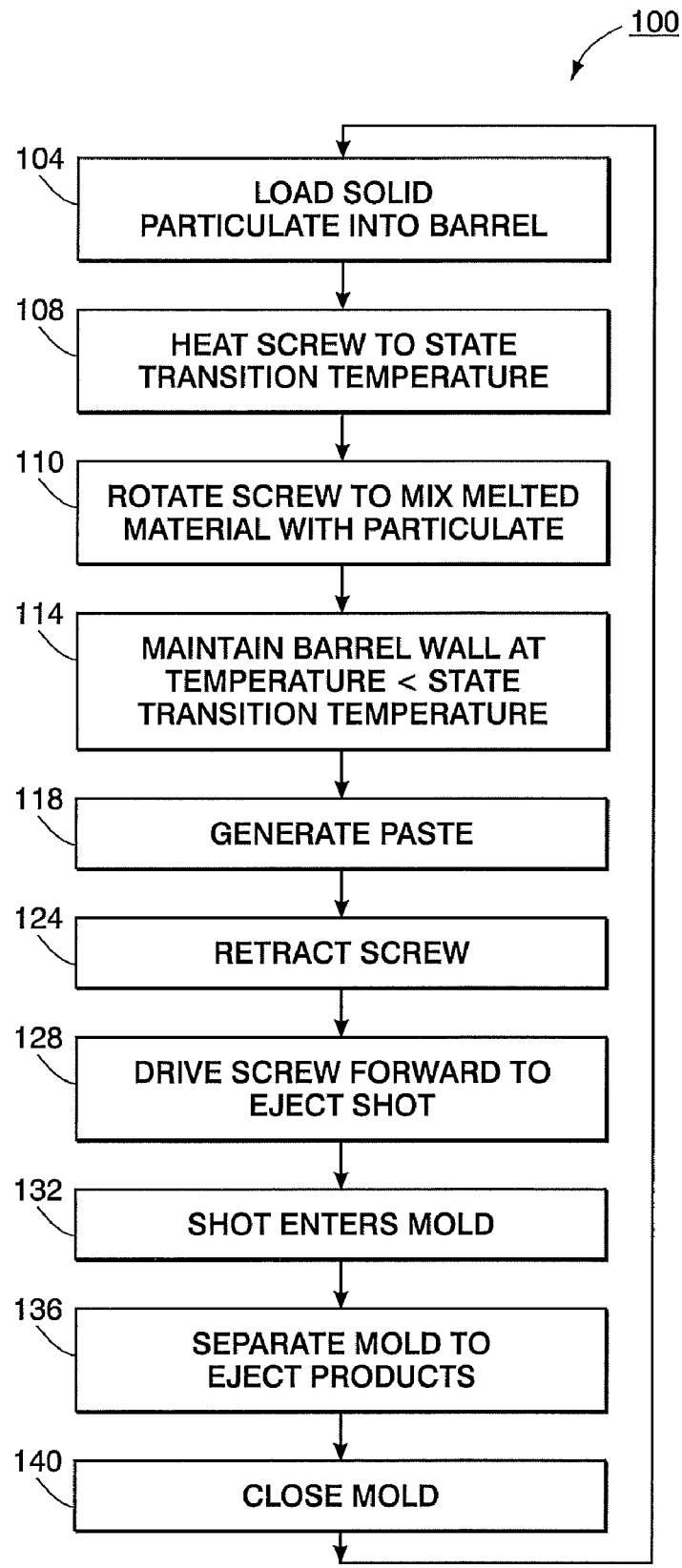
FIG. 2 is a flow diagram of a process that may be implemented by configuring the controller of the machine in FIG. 1 to perform the process.

A method 100 that may be implemented by programmed instructions executed by the controller is shown in FIG. 2. In general, the method generate a paste from the solid ink particulate, injects a portion of the paste under pressure into a cooled mold having at least two separable shells that form ink stick cavities, and separates the shells of the mold to release solid ink sticks from the ink stick cavities. The injection pressure used in one application was nominally about 10 Bar during the initial and mid-phase of fill and was increased to about 40 Bar to ensure the mold was fully packed at the end of the fill cycle. In one embodiment, solid ink particulates are loaded from a source, such as a hopper of an injection molding machine, into the barrel of the machine (block 104). In other embodiments, the dyes may be mixed with melted quantities of wax-like material to form the ink in a liquid state. This liquid ink may be fed into the injection molding machine. In the injection molding machine, the screw of the machine is heated to a temperature within a range that converts solid ink to a liquid or maintains liquid ink in a liquid state (block 108). Additionally, the wall of the barrel is regulated to a temperature within a range that converts liquid ink to a solid or maintains solid ink in a solid state (block 110). The screw is rotated to mix the melted ink proximate the screw with the solid ink proximate the barrel (block 114). The mixing of the melted ink and the solid ink particulates forms a paste that is transported by the rotating screw to the nozzle of the barrel (block 118). The screw is then retracted to enable a portion of the shot to enter the nozzle (block 124) and then the screw is driven forward to eject a shot of the paste from the nozzle of the barrel (block 128). The shot enters a mold that is cooled to a temperature that enables a portion of the shot that contacts the walls of the internal cavities to form a skin for an ink stick (block 132). The mold is separated (block 136) to enable the ink sticks to fall from the mold. The mold is then closed (block 140) and the process continues (block 104).

The injection molding machine and method of operation described above requires an injection molding machine to heat and to cool the material within the barrel of the injection molding machine. The cooling is performed by circulating a heat absorbing medium about the barrel to enable the barrel to be maintained in a temperature range that causes the material to exist in a solid state proximate the barrel. The heating is performed by circulating a heated media in the interior of a hollow screw, operating a cartridge heater within the screw, or by regulating current flow in a resistive heater associated with the screw. By providing ink in both a solid state and a liquid state within the injection molding machine, a paste can be formed having a consistency that enables the screw to transport the paste forward to an outlet and eject the paste into a cooled mold. The temperature of the mold enables the paste to flow through the gates and passageways of the mold and, upon contact with a wall of an internal cavity, form a skin. This skin provides an exterior for the ink stick with relatively few surface defects. The skin also enables the remaining paste to fill the interior of the skin without voids. Upon release of the stick from the mold, the skin is sufficiently solid that little or no breakage occurs in the ensuing handling or occasional mishandling and the continued cooling is sufficiently uniform that dimples, cracks, and other defects are less likely to form than with other previously known methods for ink stick formation.

The injection molding machine and method described above may be used to form solid objects from food materials that are capable of being both liquid and solid. For example, chocolate, taffy-like candies, and cheese can be melted to form a liquid and cooled to form a solid. Consequently, such food products may be fed to an injection molding machine as either a liquid or a solid and treated by the screw and barrel to form a food paste. This food paste may then be transported by the screw to the ejection port and shot into a cooled mold for formation of a solid food object, such as a chocolate bar or cheese block. Other products, for example, candle wax, soaps, and cosmetics, may also be molded with this method.

In another embodiment of the injection molding machine useful for manufacturing solid ink sticks or food objects, the paste may be produced outside of the injection molding machine. The paste may be made, for example, by mixing a predetermined quantity of the material in a solid state with a predetermined quantity of the material in the liquid state to form the paste. The paste may then be pumped or gravity fed into the injection molding machine. The barrel and screw of the injection molding machine are regulated by the controller to remain within a temperature range that keeps liquid material proximate the screw and solid material proximate the barrel. The paste material is transported to the ejection port and shot into the cooled mold as described before.

Figure 3:
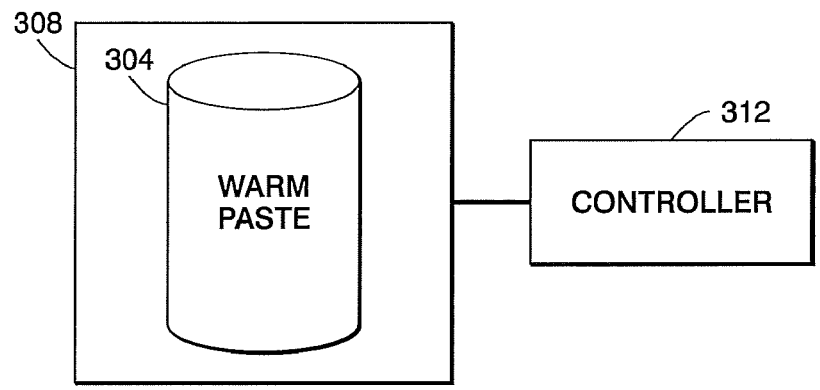
FIG. 3 illustrates an alternative method for manufacturing the paste that is injected into the mold of FIG. 1.
Figure 4:
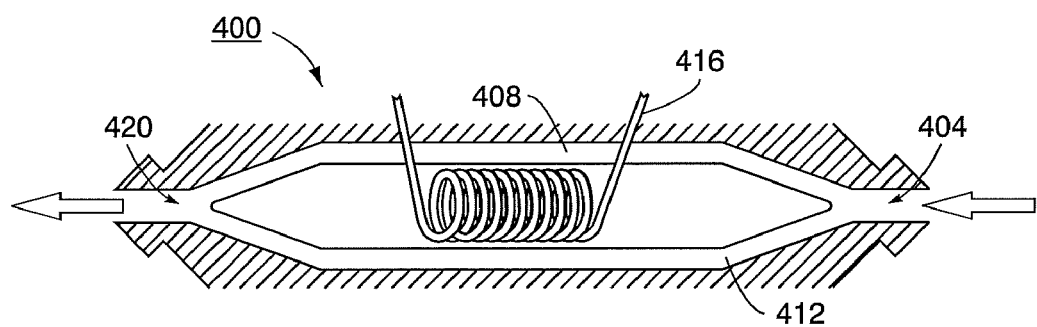
FIG. 4 illustrates another alternative method for manufacturing the paste that is injected into the mold of FIG. 1.

Other method may be used to obtained material pastes. For example, the described material paste consistency can be attained by a method in which a large mass of material is held in a volumetric container, such as container 304 shown in FIG. 3, which is placed in a heating chamber 308, such as an oven. A controller 312 is coupled to temperature sensors (not shown) in the heating chamber so the controller can regulate the chamber temperature at an appropriate temperature for a sufficient time to obtain uniformity in the paste without melting material in the container. FIG. 4 illustrates another example in which solidified material is forced into inlet 404 of a barrel 400 and urged through constricting passages 408 and 412. The passages are brought to elevated temperatures by a heating element 416 to heat the material. Additionally, barrel 400 may include a heater that is coupled to a controller for temperature regulation. The convergence of the materials before exiting through the outlet 420 mixes the heated flows for formation of the paste. Again, heating element 416 may be coupled to a controller for regulation of the temperature of the passageways.

It will be appreciated that various of the above-disclosed and other features, and functions, or alternatives thereof, may be desirably combined into many other different systems or applications. For example, the described material paste consistency can be attained by methods other than those disclosed, such as holding a large mass of material at an appropriate temperature for a sufficient time to obtain uniformity and limiting the heater source to prevent melting from occurring. An additional example is to force solidified ink through constricting passages brought to elevated temperatures to both heat and mix the material for formation of the paste. Various presently unforeseen or unanticipated alternatives, modifications, variations, or improvements therein may be subsequently made by those skilled in the art, which are also intended to be encompassed by the following claims.

What is claimed is:

1. A method for manufacturing solid ink sticks comprising:
moving solid ink particulates from an inlet supply in an injection molding machine to a conveyor within the barrel, the conveyor being heated to keep the conveyor in a first temperature range that melts the solid ink particulates and maintains the melted ink proximate the conveyor in a liquid or nearly liquid state;

cooling a portion of the barrel to keep the portion of the barrel in a second temperature range that maintains the solid ink particulates proximate the portion of the barrel in a solid or near solid state, the cooled portion of the barrel is separated from the heated conveyor to enable the liquid ink and the solid ink particulates to mix in an area between the heated conveyor and the cooled portion of the barrel;

mixing with movement produced by the heated conveyor the solid or near solid state ink with the liquid ink in the area between the heated conveyor and the cooled portion of the barrel to generate a solid ink paste;

injecting a portion of the solid ink paste under pressure into a mold having at least two separable shells that form ink stick cavities, the mold being maintained within a temperature range that enables the solid ink paste injected into the mold to form a skin upon contact with a wall of one of the ink stick cavities in the mold; and separating the shells of the mold to release solid ink sticks from the ink stick cavities in the mold.

2. The method of claim 1 wherein the solid ink particulates have a diameter in a range of about ten millimeters to about one-half of one micron.

3. The method of claim 1 wherein the heated conveyor is a screw extruder.

4. The method of claim 1 wherein the heated conveyor is a ram injector.

5. The method of claim 1 wherein the first temperature range is about 95 degrees C. to about 135 degrees C.

6. The method of claim 1 further comprising:
injecting the paste into the mold at a pressure of about 10 Bar to about 40 Bar.

7. The method of claim 1 further comprising:
maintaining the mold within the temperature range of about −15 degrees C. to about 15 degrees C.

8. A method for manufacturing solid ink sticks comprising:
feeding liquid ink into a barrel of an injection molding machine;

heating a conveyor within the barrel of the injection molding machine to keep the conveyor in a first temperature range that maintains the liquid ink proximate the conveyor in a liquid state;

cooling a portion of the barrel to keep the portion of the barrel in a second temperature range that forms solid ink proximate the barrel;

mixing with movement produced by the heated conveyor the solid ink with the liquid ink in an area between the cooled portion of the barrel and the heated conveyor to generate the solid ink paste;

injecting a portion of the solid ink paste under pressure into a mold having at least two separable shells that form ink stick cavities, the mold being maintained within a temperature range that enables the solid ink paste injected into the mold to form a skin upon contact with a wall of one of the ink stick cavities in the mold; and separating the shells of the mold to release solid ink sticks from the ink stick cavities in the mold.

9. The method of claim 8 wherein the first temperature range is about 45 degrees C. to about 65 degrees C.

10. The method of claim 8 wherein the second temperature range is about 95 degrees C. to about 135 degrees C.

* * * * *